United States Patent
Shiuh

[15] 3,695,763
[45] Oct. 3, 1972

[54] A METHOD OF DETERMINING ONE OR MORE PROPERTIES OF ASBESTOS FIBERS TURBIDITY MEASUREMENT

[72] Inventor: Jerome Chung Hsuing Shiuh, Highland Park, N.J.

[73] Assignee: Johns-Manville Corporation, New York, N.Y.

[22] Filed: Nov. 27, 1970

[21] Appl. No.: 93,002

[52] U.S. Cl. ..................356/36, 250/218, 356/208
[51] Int. Cl. .................................................G01n 1/10
[58] Field of Search..........356/36, 72, 208, 103, 104; 250/218

[56] References Cited

UNITED STATES PATENTS 3,498,719   3/1970   Wing et al. .................356/36

*Primary Examiner*—Ronald L. Wibert
*Assistant Examiner*—Orville B. Chew, II
*Attorney*—John A. McKinney and Robert M. Krone

[57] ABSTRACT

An improved procedure for determining strength and drainage properties of asbestos slurry. The test sample can be either an asbestos fiber slurry or the effluent from an asbestos fiber wet screening. The turbidity reading varies directly with the amount of fine particles present in the dispersion, which amount is related to the fiber strength. Correlation curves can be made from known fiber samples in order to predict the properties of an unknown asbestos fiber. The drainage properties of the fiber can be determined from the rate of fines removal measured as a change in the turbidity of a slurry. Correlation curves for drainage properties can also be made. The test procedure eliminates errors in filtering, drying, weighing and calculating which could arise in previously used tests.

17 Claims, 6 Drawing Figures

INVENTOR.
JEROME CHUNG HSUING SHIUH
ATTORNEY

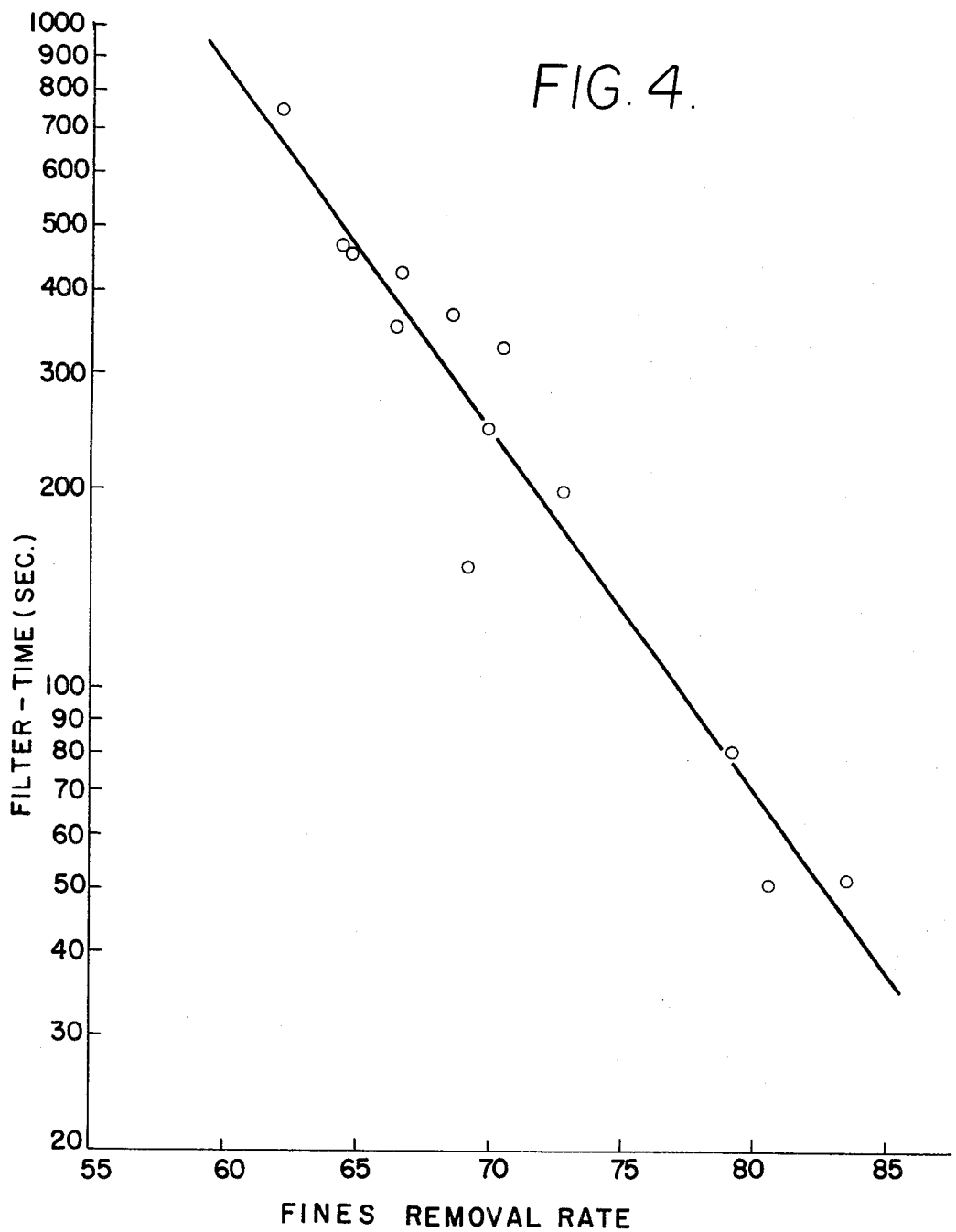

METHOD OF DETERMINING ONE OR MORE PROPERTIES OF ASBESTOS FIBERS TURBIDITY MEASUREMENT

BACKGROUND OF THE INVENTION

1. Field of the Invention

This invention relates to an improved process for determining the strength and drainage properties of asbestos fibers.

2. Description of the Prior Art

A variety of test methods have been devised to measure the strength and drainage properties of asbestos fibers. Tests which measure the strength properties of such fibers include the Strength Unit test, the Bauer-McNett Wet Classification test, the Wet Wash test and the Rotary Wet Wash test. As is apparent from the following description, all of these separate tests are time consuming and are subject to errors in computation and procedure.

For example, in the Q.A.M.A. Strength Unit test (Q.A.M.A. Test F-2, "Q.A.M.A." being the abbreviation of Quebec Asbestos Mining Association) the following procedure and calculations must be followed in order to determine the strength-giving properties of specific grades of asbestos fibers in asbestos-cement products. First, 10 cakes of asbestos-cement are asbestos-cement by mixing quantities of fiber, cement and silica to get a sample weighing 145 grams. The preparation of the cakes takes approximately 25 minutes during which the dry stock must be mixed for 5 minutes at 78 rpm, a slurry of 450 cc. of water and the dry mix prepared, the slurry mixed at 600 rpm and poured into a mold, the die started to dewater the cake, pressure applied to form the cake which remains in the mold for a specified dwell time, and the cake removed from the mold. Following the preparation of the cakes, they must cure extending over a period of 60 hours. The curing includes a moist cure of 16 hours, a steam cure in autoclave for 20 hours and saturation in water for 24 hours. The samples are then tested to determine the volume of the saturated sample, the saturated weight, the saturated transverse strength, the specimen thickness and the dry weight after 24 hours of drying. Following this, calculations must be made to determine the dry density, modulus of rupture, the corrected modulus of rupture, the fiber content required to yield a standard strength and finally the strength units.

As stated in Q.A.M.A. Test F-2, the following definition is the basis for the test: A fiber that gives the standard strength (275 Kg/cm$^2$) at the standard density (1.60 gm/cm$^3$) when used as 10 percent of the furnish is defined as having 100 strength units. Therefore, by knowing the percent fiber required in the mix to give standard strength, it is possible to calculate the strength units as follows:

$$\text{Strength units} = \frac{1000}{\% \text{ fiber required in mix}}$$

Thus, the quantity of fiber required in an asbestos-cement furnish varies inversely with the number of strength units it possesses. That is, a larger amount of fiber is required for a fiber which has a lower strength unit that a fiber having a higher strength unit.

It is apparent that the above described test is extremely time consuming, involved, requires large equipment and is subject to many errors.

A similarly involved test is the Bauer-McNett Wet Classification test (Q.A.M.A. Test C-1) which is used to determine the fines or dust content and length distribution of asbestos fiber. In this test four screens of progressively decreasing size, the smallest being 200 Tyler Mesh, are provided with filter paper and water is allowed to flow over the screen. A test sample of fibers is added to the water to obtain a slurry and the test slurry is flowed over the screens for a period of 20 minutes. At the end of this time, the filter papers are removed, the samples are dried and weighed to determine the fines content in the original sample as a percent of −200 mesh particles in the original sample. This test is a lengthy one and leaves much room for errors in drying, weighing and calculating.

The Q.A.M.A. Wash Test (Test C-4) has also been used to determine fines content on a specified sieve. This test involves the placement of a fiber sample on a 200 mesh screen, initially wetting the sample, washing the sample for 2 minutes, transferring the sample to a funnel and filtering the same on filter paper, drying the residue to a constant weight and weighing the residue. The difference between the final weight and the initial weight is the fines content. Again, this test is open to errors in filtration, drying and weighing.

A test similar to the Q.A.M.A. Wash Test is the Rotary Wet Wash test which differs from the former in that the screen is rotated in a circular direction and the nozzles which flow water onto the screen are also rotated. A wash period of 2 minutes, 45 seconds is used. After the wash, the material is filtered, dried and weighed to obtain the weight of the constituents above 200 mesh and thus the weight of the −200 mesh particles as well as the percent fines.

It can be seen that prior to this invention it was thought that strength properties of asbestos fibers could only be accurately determined by either testing a finished product made from the fibers or weighing the fibers after separation of the fines, filtration and drying. This invention has found, contrary to the suggestions of the prior art, that an accurate determination of asbestos fiber strength can be made without testing a finished product and without weighing the fibers subsequent to a separation treatment. The test procedure of this invention produces accurate results in much less time than previous tests and also eliminates errors attendant with such tests. A rapid determination of the strength and drainage properties of asbestos fibers is important in that it is possible to inform the milling plant of the type of fiber which is being mined at a particular location so that the plant can adjust its milling operations accordingly.

A wide variety of filtration tests have also been devised to estimate the performance of asbestos fibers in a wet machine operation. It is important to determine the drainage properties of asbestos fibers in view of the fact that many asbestos manufacturing processes, for example, pipe making and paper making, include draining operations.

One such test is a test based upon a TAPPI filtration test. This test is used to determine the filtering characteristics of fibrous slurries and is primarily a test used in the wood pulp industry, specifically TAPPI-1002-sM-52. This test has been modified in order to judge the filtering properties of asbestos fibers.

In this modified test, a measured column of water is allowed to drain through a forming asbestos fiber cake on a 60 Mesh wire screen by gravity flow. The drainage time for a given volume of slurry is measured. The drainage tester used in the test includes a volume calibrated cylinder, for example, a cylinder having calibration marks so as to measure off 1,840 cc. volume of water. The test procedure is as follows. One half of the cylinder is filled with water at 70° F. and a preweighed asbestos fiber sample is mixed or slurried into a beaker with 300 cc. of water at 70° F. The fiber sample weight can be 1, 2, 3 or 4 grams and preferably samples of each weight should be tested. The asbestos slurry is poured into the test cylinder and additional water at 70° F. is added to bring the slurry level to the upper calibrated mark. A long-handled stirring plunger is used to agitate the slurry within the cylinder. The slurry is agitated about 12 to 15 strokes. A drainage valve at the bottom of the cylinder is opened and simultaneously a stop watch is started. The stop watch is stopped when the water level has drained to the bottom marking. The elapsed time in seconds is recorded as "filter time." Three determinations should be made and the average value recorded for any single sample fiber weight. It can be seen that such a test although effective includes such drawbacks of being relatively lengthy depending upon the drainage property of the fiber and requires coordination between the opening of the drainage valve and the starting of the stop watch.

It is apparent that the prior art suggested that drainage properties of asbestos fibers could accurately be determined only by subjecting the fibers to a drainage test. I have found, contrary to these suggestions, that the drainage properties of asbestos fibers can be accurately determined without a drainage test and in a more rapid manner.

OBJECTS OF THE INVENTION

An object of the invention is to provide a rapid and accurate test for predicting strength and drainage properties of asbestos fibers.

Another object of the invention is to provide a test procedure which eliminates errors in filtering, drying, weighing and calculating which could arise with previous tests.

A further object of the invention is to provide a test procedure which is suitable for use as an in-process quality control technique in an asbestos milling operation.

SUMMARY OF THE INVENTION

The present invention overcomes the problems attendant with known test procedures for determining the strength and drainage properties of asbestos fibers. The invention provides a test procedure which is accurate and reproducible as well as extremely rapid and capable of being used as an in-process quality control technique in an asbestos milling operation. The test procedure makes use of a turbidity measurement in predicting the fiber properties. I have found that by measuring the turbidity, a surprisingly accurate correlation to fines content and thus to the properties of the fiber is obtained.

It has has been found that fibers having high fines contents also contain more individual particles per unit weight. The amount of particles can be measured by directing a beam of light through a dispersion of asbestos fibers in water or through the effluent from a fiber wet screening and measuring the amount of light which is scattered back or reflected. The amount of back scattering is dependent upon the amount of particles in solution. For a greater number of particles in solution, more light will be scattered back and less light will be transmitted through the solution. Conversely, a small number of particles in solution will result in a greater transmission of light and a lesser back scattering effect.

By measuring a specific optical property of an asbestos slurry, its turbidity, the fines content of the slurry can be determined. The fines content is related to the strength properties of the asbestos fibers since it has been recognized that the fines contribute little if any to the strength of asbestos fibers and articles made therefrom. A fiber having a relatively high fines content would have a relatively low strength whereas a fiber having a relatively low fines content would have a relatively high strength. Thus by knowing the fines content, the strength properties of asbestos fibers can be determined.

Turbidity is an expression of the optical property of a sample which causes light to be scattered and absorbed rather than transmitted in a straight line through the sample. The turbidity is created by the presence of suspended matter in the sample.

The term fines is customarily used to describe particles of asbestos incorporated in a fiber bundle which are smaller than 200 Tyler Mesh (sometimes designated "200M"), that is, which pass through a 200 Mesh screen. The amount of fines present can be expressed as "percent −200M," which is the weight percent of fines. An expression related to the percent fines is "percent +200M," which is the weight percent of constituents larger than 200 Mesh. It is apparent that percent fines equals 100 minus percent +200M.

The term "as received" fiber as used herein refers to asbestos fiber which has been classified as to size but which has not been subjected to any further processing operations.

The fiber groups referred to in this application are those determined by the Q.A.M.A. classification system.

BRIEF DESCRIPTION OF THE DRAWINGS

The nature of the invention will be more fully understood and other objects may become apparent when the following detailed description is considered in connection with the accompanying drawings wherein:

FIG. 4 is a correlation curve of filter time vs. fines removal rate obtained by the method of the invention and useful in predicting the filtration properties of asbestos fibers;

DESCRIPTION OF THE PREFERRED EMBODIMENT

The turbidity of an asbestos slurry can be measured by an instrument known as a turbidimeter. Such a machine uses the back-scatter principle to achieve the measurement of suspended solids in a solution and the instrument consists of a beam of light which enters the fluid and "bounces" back to a photocell detector system to provide a readout. A commercial machine which has been found useful in this invention is the Gam Rad Model 150 Fluid Analyzer. Such an instrument provides a continuous reading of the turbidity of a sample so that is is possible to determine the turbidity at any particular instant. This enables a prediction of filtration properties of the fiber as one can determine the turbidity of a sample after a specified period of time, as is more fully discussed below.

When asbestos fibers are dispersed in water and passed through a turbidimeter, a fiber with more fines or particles per unit weight scatters back more light and, therefore, indicated higher slurry turbidity. In a similar manner, effluents resulting from wet screening a high fines content fiber have a higher turbidity than effluents from a low fines content fiber. Tests have shown that the turbidity of either a fiber-water slurry or the effluent from a wet screening operation correlated well with the known strength-giving properties of the fiber.

Figure 1:
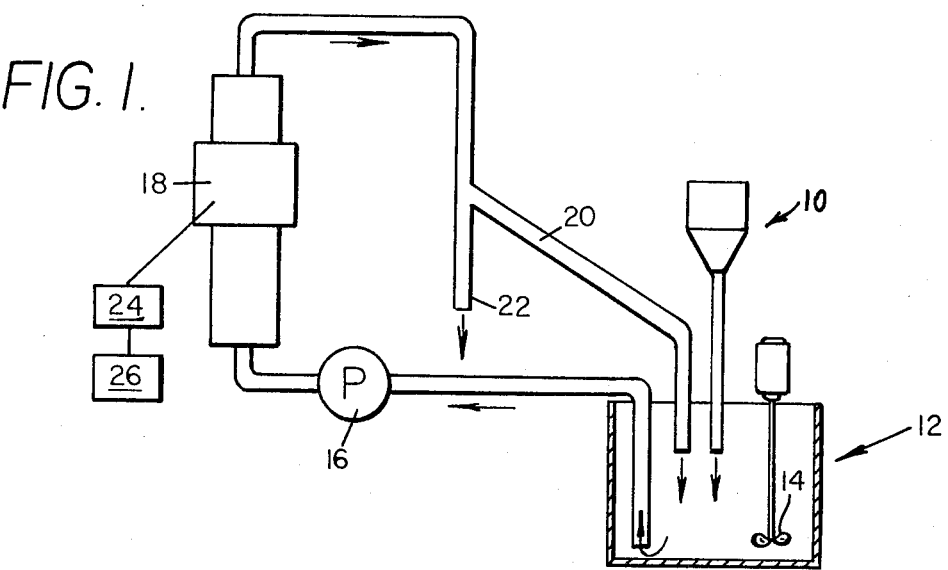
FIG. 1 is a schematic flow line of the method of this invention.

The system shown as a schematic in FIG. 1 has been found to be particularly useful in obtaining turbidity measurements. In order to obtain accurate measurements, the turbidimeter is standardized by passing water which contains no asbestos fibers or fines through the machine and adjusting the reading to zero. When it is desired to obtain a turbidity reading of an effluent from a set screening operation, the following procedure is used. A mixing tank 12 having a mixer 14 is filled with a quantity of water. A fiber sample is placed on screen 10 and then washed with a stream of water from a washer not shown. Fiber effluent enters the mixing tank and is pumped into a turbidimeter 18 by pump 16 and thereafter recirculated back to the tank through hose 20. A control unit 24 is responsive to the signal from the photoelectric sensor in the turbidimeter and records the turbidity change on recorder 26. The turbidity change versus time of wet screening is used to interprete filtration characteristics of the fiber. After a predetermined period of wash time, the final turbidity is recorded when the screening is finished. Using fibers having a known or predetermined strength value (strength units) or percent fines, a correlation curve between the final turbidity of the effluent and the known value can be produced. Such a curve is useful in determining percent fines or strength values of an unknown sample. That is, once a turbidity reading is obtained, the percent fines or strength value can be determined by interpolating from the correlation curve.

A correlation curve can also be obtained between the turbidity change measured at two distinct points in time during the screening operation and the known fiber filtration properties. To predict the filtration characteristics of asbestos fiber, this invention has found that the filtration characteristics of the fiber is a function of the fines removal rate in a wet screening system. The fines removal rate is defined as the ratio between the quantity of fines removed at an early stage (about 35 seconds) of wet screening and the total fines content as determined at the end of the test (approximately 3 minutes). As the quantity of fines removed varies directly with the turbidity reading, this ratio can be expressed as a ratio between the turbidity reading at about 35 seconds of wet screening and the turbidity reading at the end of the wet screening. The turbidity at about 35 seconds after initiation of wet screening is used to determine the fines removal rate because it has been found that the turbidity of the effluent of wet washing usually reaches a maximum at this time. It should be apparent that turbidity readings at other points in time during the wet screening could be used to determine a fines removal rate. Asbestos fibers having known filter times are wet screen tested and their fines removal rate is determined. A correlation curve can be obtained between the fines removal rate and the known filtration property by subjecting fibers having different known filtration properties to the test. In this manner, the unknown filtration properties of a fiber can be predicted by determining the fines removal rate using turbidity measurements.

This invention has also found that the filtration or drainage properties of asbestos fibers can be predicted by measuring the slope of a turbidity — time curve since the slope represents a ratio of turbidity readings and hence is proportional to the fines removal rate. Such a curve can be obtained by continuously recording the turbidity during the period of wet screening on recorder 26 which is responsive to the signal from the sensing device in turbidimeter 18.

The procedure used to predict the filtration or drainage properties of asbestos fiber has the added benefit of allowing a prediction of the unknown strength properties of the fiber to be made from the same set of test data because a turbidity reading at the end of the wet washing is obtained. As described previously, this final turbidity of the effluent can be correlated to a strength property. It is apparent that from a single test procedure which includes at least one turbidity measurement during wet screening and a final turbidity measurement at the end of wet screening (preferably a continuous turbidity measurement), it is possible to predict both the strength and drainage properties of the fibers by interpolating from the respective correlation curves.

The strength properties of asbestos fiber can also be predicted by measuring the turbidity of a slurry of "as received" fibers without wet screening the fibers. The system of FIG. 1 can also be used to measure the turbidity of the fiber-water slurry. A standardized slurry of "as received" fibers is prepared and introduced into mixing tank 12 without a screening operation. The fiber slurry is then pumped by pump 16 through turbidimeter 18 and exits through drainage hose 22 to a sink. A turbidity readout is obtained from control device 24 and is recorded on recorder 26. In making such a measurement, the asbestos fibers as well as the fines reflect the light beam which is passed through the slurry. Since the number of fines particles is much larger than the number of longer asbestos fibers in the slurry, it is possible to accurately predict the percent fines or strength value of the slurry even though the longer asbestos fibers are present. By measuring the turbidity of several asbestos fiber slurries, a correlation curve can be obtained between the turbidity readout and the percent fines or strength value. From such a correlation curve, the percent fines or strength value can be predicted from an unknown fiber slurry. This method is a particularly useful test in that increased speed and improved economics result since the screening test is eliminated.

The following are examples of the invention in which the strength and drainage properties of asbestos fibers were determined. It should be noted that wash times and the times used to calculate the fines removal rate are approximate and merely preferred and that these times could be shorter or longer as desired. It should further be noted that the sample weights and concentrations used are only exemplary. It also be noted that the following examples merely depict preferred embodiments of the invention.

EXAMPLE I

A Gam Rad Model 150 Fluid Analyzer is employed in a system as is shown in FIG. 1. The fluid flow through the instrument is vertically upwards so as to eliminate any air bubbles which would also scatter the light and produce erroneous readings. The machine is standardized in a manner as mentioned previously. Samples of asbestos fibers having known Q.A.M.A. Strength Units and weighing 10 grams are placed upon a screen having a 200 Tyler mesh, which is part of a rotary wet wash unit. A 25 liter mixing tank is used. The mixing tank was filled with 4 liters of water. The water volume remains constant throughout the test method. The rotary wet wash unit, similar to that used in the conventional Rotary Wet Wash test, is started so that the water nozzles and the screen are both rotated. The mixer in the mixing tank and the pump into the analyzer are also started. Initiation of these three devices can by synchronized. Fiber effluent starts to come down to the mixing tank and is recirculated through the fluid analyzer at a pumping rate of 18 liters/minute, and back to the mixing tank through a hose. A control unit and amplifier pick up the signal from the fluid analyzer during the process of washing. A recorder starts to record or register the signal on a tape. When the rotary unit stops, the fiber slurry is pumped out of the system to a sink. The final turbidity reading is recorded during the pumping out cycle. The rotary unit operates for a period of about 2 minutes, 45 seconds to obtain a complete washing and the pumping out to obtain a stable reading on the recorder lasts for about 15 seconds so that the total test time is about 3 minutes. The amplified turbidity is measured in terms of micro-amps on the unit. After the turbidity of several samples is taken, a correlation curve is produced by plotting either the known percent +200 M or the known strength value of the fiber against the final turbidity of the effluent. The result of a series of runs is shown in Table I.

Turbidity Readings For Screened Fiber

Table 1

| Sample | Q.A.M.A. Strength Unit | Turbidity ($\mu A$) |
| --- | --- | --- |
| 1 | 127 | 2.8 |
| 2 | 118 | 3.8 |
| 3 | 108 | 5.7 |
| 4 | 100 | 7.6 |
| 5 | 99 | 8.1 |
| 6 | 84 | 11.4 |
| 7 | 75 | 11.8 |
| 8 | 70 | 13.3 |
| 9 | 65 | 14.4 |
| 10 | 48 | 18.2 |
| 11 | 41 | 19.1 |

Figure 2:
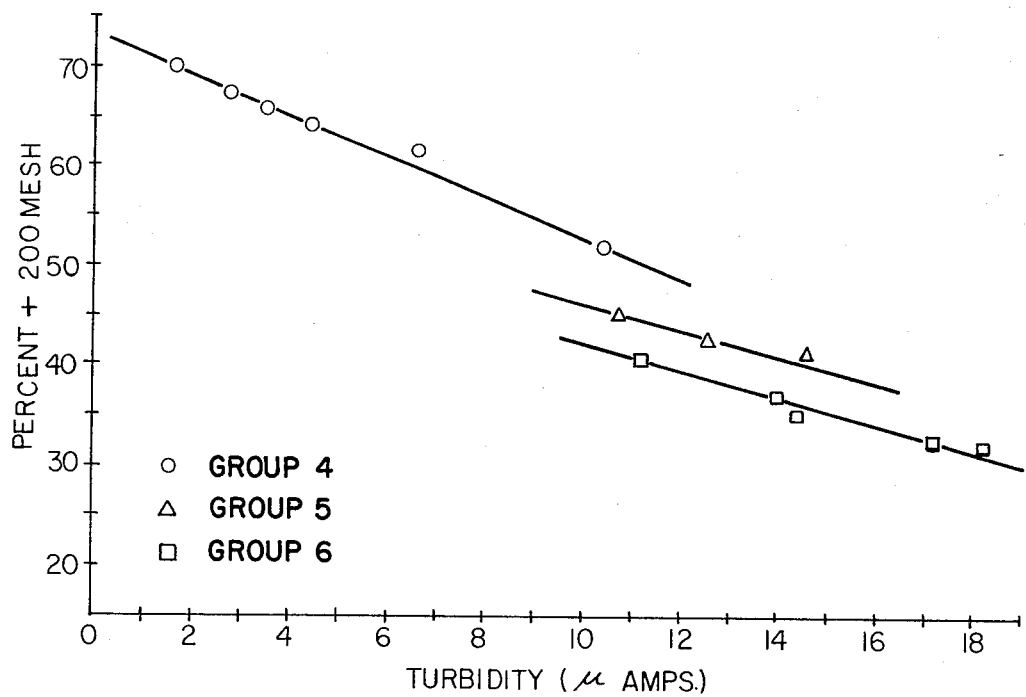
FIG. 2 is a correlation curve of percent +200M vs. turbidity of a wet screening effluent obtained by the disclosed method and useful in predicting the strength of asbestos fibers of Groups 4, 5 and 6.
Figure 3:
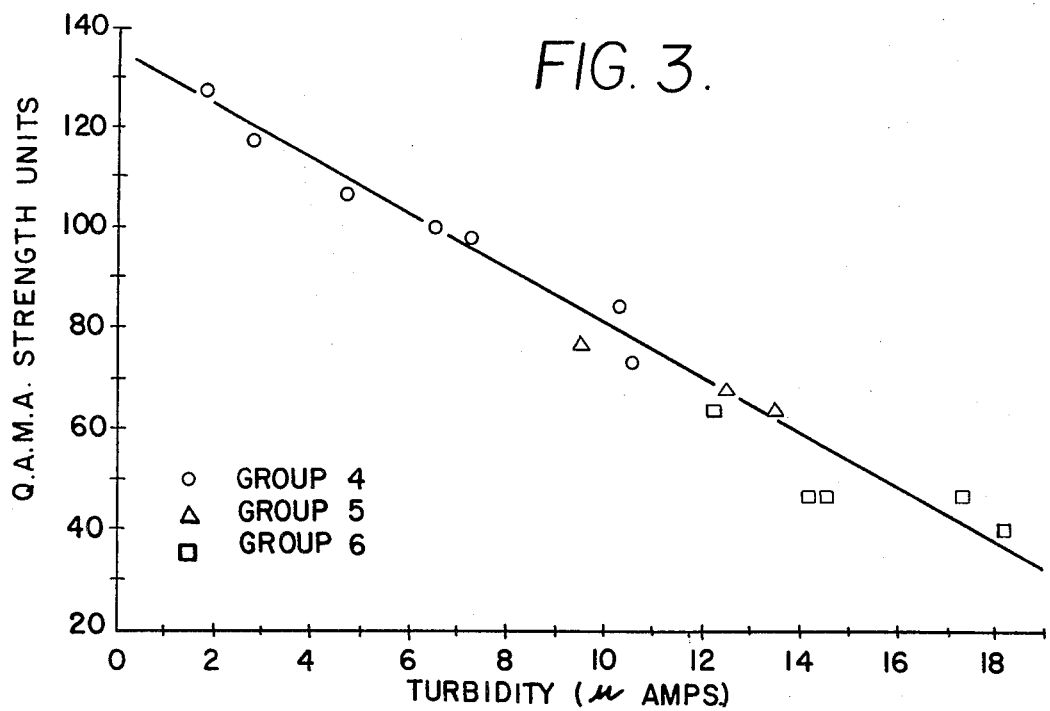
FIG. 3 is a correlation curve similar to that of FIG. 2 except that strength units vs. turbidity is plotted.

From a table similar to Table 1, a graph of either percent + 200 M or strength units versus the turbidities can be made. A plot of percent + 200 M vs. turbidity is shown in FIG. 2, for three groups of chrysotile asbestos fibers, that is, Groups 4, 5 and 6. As can be seen, correlation between the turbidity readings and the percent fines is good, resulting in a linear relationship. From such a correlation curve, the percent fines of an unknown fiber sample can be determined by interpolating from a measured turbidity. FIG. 3 shows a plot of asbestos strength in terms of Q.A.M.A. Strength Units vs. turbidity. The relationship for fibers of Groups 4, 5, and 6 is one straight line. Thus, for any fiber in these groups, a turbidity reading can be correlated into a predicted strength unit for that fiber.

EXAMPLE II

In this example, the apparatus of FIG. 1 is employed to obtain turbidity readings for "as received" fiber. An asbestos slurry is flowed into the mixing tank without going through the screen. Asbestos slurries are prepared by weighing 1.5 grams of asbestos fiber and mixing the fiber with water in the mixing tank to produce a concentration of 0.1 gm/liter. The fibers used have known Q.A.M.A. Strength Units. The fiber slurry is then pumped through the sensing device of the turbidimeter and thereafter discarded through a sink. A turbidity reading is obtained from the instrument and is recorded. The procedure is duplicated for different fiber slurry samples. The results are shown in TABLE II.

Turbidity Readings For "As Received" Fiber

Table II

| Sample | Q.A.M.A. Strength Unit | Solids (gm/l) | Turbidity ($\mu A$) |
| --- | --- | --- | --- |
| 1 | 103 | 0.1 | 2.0 |
| 2 | 100 | 0.1 | 2.2 |
| 3 | 95 | 0.1 | 3.5 |
| 4 | 94 | 0.1 | 4.0 |
| 5 | 88 | 0.1 | 5.0 |
| 6 | 82 | 0.1 | 6.2 |

Figure 5:
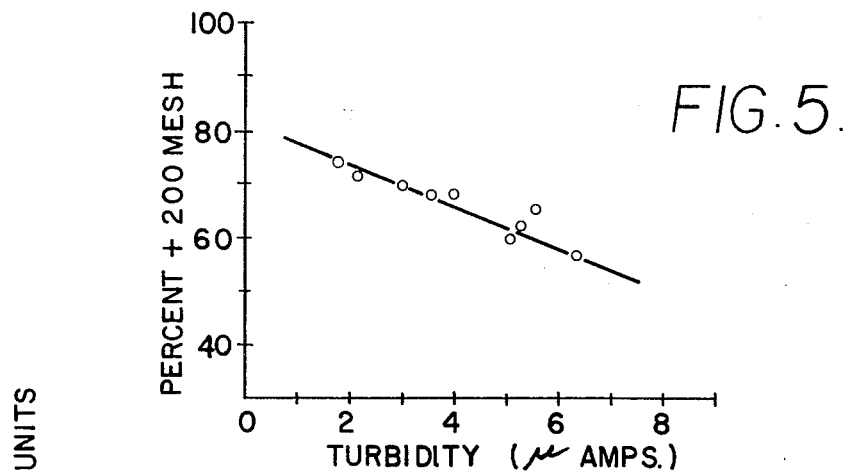
FIG. 5 is a correlation curve of percent +200M vs. turbidity of as received fiber obtained by the disclosed method and useful in predicting the strength of asbestos fibers.
Figure 6:
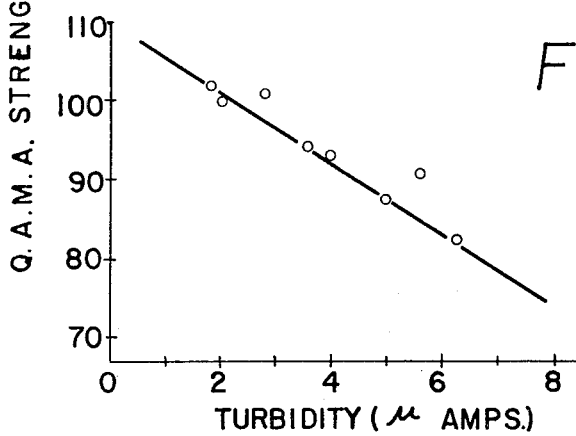
FIG. 6 is a correlation curve similar to FIG. 5 except that strength units vs. turbidity is plotted.

From a table similar to Table II, a graph of either a percent + 200 M or strength units of fiber against the turbidities can be made. Sample correlation curves are shown in FIGS. 5 and 6. It can be seen that the correlation between the turbidity measurement and the known values are good. From correlation curves of this nature, the percent + 200 M (and hence percent fines) or strength unit of an unknown asbestos fiber sample can be predicted by measuring the turbidity of the sample and then interpolating from the proper correlation curve.

EXAMPLE III

A fines removal rate of an asbestos fiber is determined by running several samples of asbestos fibers through the screen test. Since the turbidity is being constantly determined, the turbidity at about 35 seconds after rotary wet wash has begun is noted as well as the final turbidity measurement. A reading at about 35 seconds was chosen because the fines removal usually reaches its peak at about this time. Fibers having known filter times are used. The fines removal rate is determined for each fiber. After several runs are made, a correlation curve of filter time (in seconds) vs. fines removal rate is produced. A graph of this nature is shown in FIG. 4. The graph shows the results obtained from Grade 4T asbestos fibers. From a correlation curve of this nature, filtration properties of asbestos fibers can be determined merely by obtaining turbidity readings so as to obtain the fines removal rate for the unknown fiber. Thereafter, the filter time can be determined by interpolation from the correlation curve.

The above described method is useful in determining the properties of chrysotile asbestos fibers, particularly those in Groups 4, 5, and 6. However, the present invention could be utilized with any type asbestos fiber and of any group.

It was also determined that different correlation curves may be required to predict percent + 200 mesh content or the strength units for different fiber groups or fibers from different mines. This is due to differences in the color, granular content or impurities content of various fibers. These differences can be minimized by obtaining a corrected turbidity and thus a corrected turbidity correlation curve. It should be apparent that these differences in no way detract from the invention.

The method of this invention can be used as an alternative to a conventional test procedure for determining fines content or strength units, such as the Rotary Wet Wash Test, or the process can be used in conjunction with a conventional procedure as a quality control on such procedure. In the latter instance, samples could be quickly tested so as to determine if a particular test procedure is accurate. Similarly, the test method can augment or supplant conventional filtration tests.

In addition to those previously described, there are many other areas in the production and processing of asbestos fiber in which a turbidity test could be used. For example, the test procedure could also be used to check the quality of willowed fibers, that is, fiber after a willowing operation. Such an operation divides the fibers into smaller diameters and is particularly useful in the manufacture of asbestos-cement pipe. By determining the fines content of a willowed fiber, the degree of willowing of the fiber can be determined since the amount of fines increases with increased processing. The test procedure of this invention can be used to rapidly make such determinations.

Another use for the test method of the present invention would be to determine the type of fiber present in wet flow lines such as exist in asbestos paper production and asbestos-cement production.

It is to be understood that variations and modifications of the present invention may be made without departing from the spirit of the invention. It is also to be understood that the scope of the invention is not to be interpreted as limited to the specific embodiment disclosed herein, but only in accordance with the appended claims when read in the light of the foregoing disclosure.

What I claim is:

1. A method of determining strength or drainage properties of asbestos fibers, comprising:
   a. forming an asbestos slurry,
   b. measuring the turbidity of the slurry, and
   c. determining from the turbidity measurement the strength or drainage properties of the asbestos fibers sample.

2. A method of predicting the strength property of asbestos fibers having an unknown strength property comprising:
   a. forming an asbestos slurry from either the asbestos fibers or the effluent from wet screening the asbestos fibers
   b. measuring the turbidity of the slurry, and
   c. interpolating the strength property of the fiber from a correlation curve of strength property vs. turbidity at the measured turbidity of the asbestos fibers.

3. A method of predicting the drainage properties of asbestos fibers having unknown drainage properties comprising:
   a. wet screening a sample of the asbestos fibers,
   b. forming a slurry from the effluent of the wet screening,
   c. measuring the turbidity of the slurry at a first point in time during the wet screening,
   d. measuring the turbidity of the slurry at a second point in time,
   e. calculating the fines removal rate of the fiber by determining the ratio between the first turbidity measurement and the second turbidity measurement, and
   f. predicting the drainage properties of the fibers by interpolating from a correlation curve of drainage property vs. fines removal rate at the calculated fines removal rate of the asbestos fibers.

4. A method as claimed in claim 3 wherein the turbidity measurement is continuously made, wherein said first measurement of the turbidity is made at approximately the maximum turbidity reading and wherein said second measurement of the turbidity is made at the termination of the wet screening.

5. A method as claimed in claim 3 wherein the wet screening is performed for approximately 2 minutes, 45 seconds, and wherein the turbidity measurement that is made during wet screening is made after approximately 35 seconds from the initiation of the wet screening operation and further wherein the turbidity measurement made at the termination of wet screening is made after approximately 3 minutes from the initiation of the wet screening operation.

6. A method of predicting the strength properties of asbestos fibers whose strength properties are not known comprising:
   a. forming a slurry from a sample of asbestos fibers having known strength properties,
   b. measuring the turbidity of the sample slurry, c. repeating the steps of forming a slurry and measuring the turbidity of the same for several samples of asbestos fibers having known strength properties,
d. producing a correlation curve by plotting the known strength property vs. the measured turbidity reading for each sample of asbestos fibers,
e. forming a slurry from a sample of the asbestos fibers which have unknown strength properties,
f. measuring the turbidity of the unknown sample, and
g. determining the strength properties of the fibers in the unknown sample by interpolating the strength properties from the correlation curve at the point corresponding to the measured turbidity of the unknown sample.

7. A method of predicting the strength properties of asbestos fibers whose strength properties are not known comprising:
   a. forming a slurry from the effluent of a wet screening of a sample of asbestos fibers having known strength properties,
   b. measuring the turbidity of the sample slurry,
   c. repeating the steps of forming a slurry and measuring the turbidity of the same for several samples of asbestos fibers having known strength properties,
   d. producing a correlation curve by plotting the measured turbidity reading vs. the known strength property for each sample of asbestos fibers,
   e. forming a slurry from a sample of the asbestos fibers which have unknown strength properties,
   f. measuring the turbidity of the unknown sample, and
   g. determining the strength properties of the fibers in the unknown sample by interpolating the strength properties from the correlation curve at the point corresponding to the measured turbidity of the unknown sample.

8. A method of predicting the drainage properties of asbestos fibers having unknown drainage properties comprising:
   a. wet screening a sample of asbestos fibers having known drainage properties,
   b. forming a slurry from the effluent of the wet screening,
   c. measuring the turbidity of the slurry at a point in time during the wet screening,
   d. measuring the turbidity of the slurry at the termination of the wet screening,
   e. calculating the fines removal rate of the fibers by determining the ratio between the turbidity measurement during the wet screening and the turbidity measurement at the termination of the wet screening,
   f. repeating the steps of the wet screening, forming a slurry, measuring the turbidity during and at the termination of the wet screening, and calculating the fines removal rate for several samples of asbestos fibers having known drainage properties,
   g. producing a correlation curve by plotting the known drainage properties vs. the calculated fines removal rate for each sample of asbestos fibers,
   h. wet screening a sample of the asbestos fibers which have unknown drainage properties,
   i. forming a slurry from the effluent of the wet screening of the unknown sample,
   j. measuring the turbidity of the slurry of the unknown sample at a point in time during the wet screening,
   k. measuring the turbidity of the slurry at the termination of the wet screening,
   l. calculating the fines removal rate of the fibers in the unknown sample by determining the ratio between the turbidity measurement during the wet screening and the turbidity measurement at the termination of the wet screening, and
   m. determining the drainage properties of the fibers in the unknown sample by interpolating the drainage properties from the correlation curve at the point corresponding to the calculated fines removal rate.

9. A method of determining strength or drainage properties of asbestos fibers, comprising:
   a. washing a sample of asbestos fibers with a liquid to produce an effluent having particles from said fibers including fine particles of a predetermined maximum size,
   b. passing said effluent including said fine particles through a screen for removing substantially all of the particles larger than said fine particles from said effluent,
   c. collecting said effluent including said fine particles after the passage thereof through said screen,
   d. measuring the turbidity of said collected effluent, and
   e. determining from the turbidity measurement the strength or drainage properties of said sample of asbestos fiber.

10. The method as recited in claim 9 wherein said effluent and fine particles are collected in a mixing tank and including
    f. mixing said effluent and fine particles in said tank,
    g. pumping the effluent and fine particles into a measuring device wherein the turbidity of the effluent is measured, and
    h. recirculating the measured effluent into said mixing tank.

11. The method as recited in claim 10 including automatically recording the turbidity measurement from the measuring device during the testing of the effluent.

12. The method as recited in claim 11 wherein the fiber sample is washed for a period of approximately 2 minutes, 45 seconds and wherein the pumping operation continues for approximately an additional 15 seconds.

13. A method as recited in claim 11 in which the drainage properties of asbestos fibers are determined including the steps of:
    j. continuously recording the turbidity measurement,
    k. obtaining the turbidity measurement at approximately 35 seconds after washing has started from the continuously recorded turbidity measurements,
    l. obtaining the turbidity measurement at approximately 3 minutes after washing has started, and
    m. calculating the fines removal rate by determining the ratio between the turbidity measurement obtained at approximately 35 seconds and the turbidity measurement obtained at approximately 3 minutes.

14. A method of determining strength or drainage properties of asbestos fibers, comprising:

a. mixing a sample of asbestos fibers with a liquid,
b. measuring the turbidity of the mixture of liquid and said sample, and
c. determining from the turbidity measurement the strength or drainage properties of the asbestos fibers.

15. A method as defined in claim 14 including the steps of:
d. introducing the asbestos fiber mixture into a mixing tank, and
e. pumping the mixture to a measuring device wherein the turbidity of the mixture is measured.

16. A method as defined in claim 1 including measuring the turbidity of the slurry by utilizing a turbidimeter.

17. A method of determining the strength or drainage properties of asbestos fibers, comprising:
a. forming a solution of liquid including fine particles from a sample of asbestos fibers,
b. measuring the turbidity of said solution, and
c. determining from the turbidity measurement the strength or drainage properties of the asbestos fibers sample.

* * * * *